(12) United States Patent
Chesnutt et al.

(10) Patent No.: US 7,912,149 B2
(45) Date of Patent: Mar. 22, 2011

(54) SYNCHRONIZATION AND SEGMENT TYPE DETECTION METHOD FOR DATA TRANSMISSION VIA AN AUDIO COMMUNICATION SYSTEM

(75) Inventors: Elizabeth Chesnutt, Troy, MI (US); Sethu K. Madhavan, Erie, PA (US); Iqbal Surti, Troy, MI (US); Jijin Yin, Los Angeles, CA (US)

(73) Assignee: General Motors LLC, Detroit, MI (US)

( * ) Notice: Subject to any disclaimer, the term of this patent is extended or adjusted under 35 U.S.C. 154(b) by 936 days.

(21) Appl. No.: 11/744,065

(22) Filed: May 3, 2007

(65) Prior Publication Data

US 2008/0273644 A1 Nov. 6, 2008

(51) Int. Cl.
*H04L 27/00* (2006.01)

(52) U.S. Cl. ........................................ 375/316

(58) Field of Classification Search .............. 375/316, 375/260, 354, 357; 370/480, 481; 455/67.4, 455/67.1
See application file for complete search history.

(56) References Cited

U.S. PATENT DOCUMENTS

| | | |
|---|---|---|
| 3,731,201 A | 5/1973 | Frisbie |
| 4,499,339 A | 2/1985 | Richard |
| 4,675,614 A | 6/1987 | Gehrke |
| 4,928,107 A | 5/1990 | Kuroda et al. |
| 5,043,736 A | 8/1991 | Darnell et al. |
| 5,223,844 A | 6/1993 | Mansell et al. |
| 5,235,633 A | 8/1993 | Dennison et al. |
| 5,365,450 A | 11/1994 | Schuchman et al. |
| 5,388,147 A | 2/1995 | Grimes |
| 5,422,816 A | 6/1995 | Sprague et al. |
| 5,539,810 A | 7/1996 | Kennedy, III et al. |
| 5,555,286 A | 9/1996 | Tendler |
| 5,712,899 A | 1/1998 | Pace, II |
| 5,754,554 A | 5/1998 | Nakahara |
| 5,786,789 A | 7/1998 | Janky |
| 5,812,087 A | 9/1998 | Krasner |
| 5,946,304 A | 8/1999 | Chapman et al. |
| 5,978,756 A | 11/1999 | Walker et al. |

(Continued)

FOREIGN PATENT DOCUMENTS

EP 0545783 6/1993

(Continued)

OTHER PUBLICATIONS

Letter of May 15, 2007, from Marc E. Hankin to Anthony Simon (1 page).

(Continued)

*Primary Examiner* — Khai Tran
(74) *Attorney, Agent, or Firm* — Anthony L. Simon; Reising Ethington P.C.

(57) ABSTRACT

A system and method for asynchronous data communication over a cellular communications network that allows the transmission of different types of data frames over a voice channel using a vocoder. The data frames include a synchronization signal and data segment, with the synchronization signal being selected in accordance with an attribute of the data segment so that, upon receipt of the data frame, the synchronization signal can be used by the demodulating modem to determine not only where the data segment begins, but also to identify what type of data segment is in the received data frame. The synchronization signals used have low cross-correlation and an auto-correlation function that approximates a unit impulse function to provide reliable transmission through the vocoder.

20 Claims, 5 Drawing Sheets

U.S. PATENT DOCUMENTS

| | | |
|---|---|---|
| 5,999,125 A | 12/1999 | Kurby |
| 6,011,806 A | 1/2000 | Herring |
| 6,049,303 A | 4/2000 | Biacs et al. |
| 6,070,089 A | 5/2000 | Brophy et al. |
| 6,091,969 A | 7/2000 | Brophy et al. |
| 6,108,317 A | 8/2000 | Jones et al. |
| 6,140,956 A | 10/2000 | Hillman et al. |
| 6,144,336 A | 11/2000 | Preston et al. |
| 6,175,801 B1 | 1/2001 | Millington |
| 6,226,529 B1 | 5/2001 | Bruno et al. |
| 6,236,652 B1 | 5/2001 | Preston et al. |
| 6,345,251 B1 | 2/2002 | Jansson et al. |
| 6,363,339 B1 | 3/2002 | Rabipour et al. |
| 6,366,772 B1 | 4/2002 | Arnson |
| 6,493,338 B1 | 12/2002 | Preston et al. |
| 6,519,304 B1 * | 2/2003 | Limberg ............ 375/364 |
| 6,611,804 B1 | 8/2003 | Dorbecker et al. |
| 6,614,349 B1 | 9/2003 | Proctor et al. |
| 6,681,121 B1 | 1/2004 | Preston et al. |
| 6,690,681 B1 | 2/2004 | Preston et al. |
| 6,748,026 B1 | 6/2004 | Murakami et al. |
| 6,771,629 B1 | 8/2004 | Preston et al. |
| 6,920,129 B2 | 7/2005 | Preston et al. |
| 7,151,768 B2 | 12/2006 | Preston et al. |
| 7,164,662 B2 | 1/2007 | Preston et al. |
| 7,173,995 B2 | 2/2007 | Karlquist |
| 7,206,305 B2 | 4/2007 | Preston et al. |
| 7,239,859 B2 | 7/2007 | Madhavan et al. |
| 2002/0001317 A1 | 1/2002 | Herring |
| 2002/0097701 A1 | 7/2002 | Lupien et al. |
| 2002/0111172 A1 | 8/2002 | DeWolf et al. |
| 2002/0175855 A1 | 11/2002 | Richton et al. |
| 2002/0177450 A1 | 11/2002 | Vayanos |
| 2003/0069694 A1 | 4/2003 | Fuchs et al. |
| 2003/0142646 A1 | 7/2003 | Paneth et al. |
| 2003/0144836 A1 | 7/2003 | Kurtz |
| 2003/0225574 A1 | 12/2003 | Matsuura et al. |
| 2004/0008618 A1 | 1/2004 | Shirakata et al. |
| 2004/0198378 A1 | 10/2004 | Hay |
| 2004/0214599 A1 | 10/2004 | Ogino |
| 2004/0220803 A1 | 11/2004 | Chiu et al. |
| 2005/0013283 A1 | 1/2005 | Yoon et al. |
| 2005/0021332 A1 | 1/2005 | Ryu et al. |
| 2005/0113061 A1 | 5/2005 | Madhavan et al. |
| 2005/0125152 A1 | 6/2005 | Fuchs et al. |
| 2005/0143916 A1 | 6/2005 | Kim et al. |
| 2005/0175113 A1 | 8/2005 | Okuyama |
| 2005/0182530 A1 | 8/2005 | Murphy |
| 2006/0154679 A1 * | 7/2006 | Chang ............ 455/502 |
| 2006/0224317 A1 | 10/2006 | Sarkar |
| 2006/0239363 A1 | 10/2006 | Blakeney et al. |
| 2006/0262875 A1 | 11/2006 | Madhavan |
| 2006/0280159 A1 | 12/2006 | Bi et al. |
| 2006/0285448 A1 * | 12/2006 | Kojima ............ 369/30.13 |
| 2007/0092024 A1 | 4/2007 | Madhavan et al. |
| 2007/0109185 A1 | 5/2007 | Kracke et al. |
| 2007/0129077 A1 | 6/2007 | Iguchi et al. |
| 2007/0135134 A1 | 6/2007 | Patrick |
| 2007/0190950 A1 | 8/2007 | Madhavan et al. |
| 2007/0244695 A1 | 10/2007 | Manjunath et al. |
| 2007/0258398 A1 | 11/2007 | Chesnutt et al. |
| 2008/0247484 A1 | 10/2008 | Chesnutt et al. |
| 2008/0255828 A1 | 10/2008 | Chesnutt et al. |

FOREIGN PATENT DOCUMENTS

| | | |
|---|---|---|
| WO | WO8912835 | 12/1989 |

OTHER PUBLICATIONS

Letter of Jun. 25, 2007 from Micah D. Stolowitz to James D. Stevens (2 pages).

Letter of Jun. 20, 2007 from Vernon W. Francissen to Anthony L. Simon (2 pages).

Lin; D., et al. "Data Compression of Voiceband Modem Signals," 40th IEEE Vehicular Technology Conference, May 6-9, 1990, pp. 323-325, Orlando, Florida.

Mueller; Joseph A. "A DSP Implemented Dual 9600/7200 bps TCM Modem for Mobile Communications Over FM Voice Radios," Aug. 20, 1997, IEEE, pp. 758-761.

Speech Coding with Linear Predictive Coding (LPC); www.dspexperts.com/dsp; retrieved Aug. 14, 2005; author unknown; 15 pages.

Phase-Shift Keying; retrieved from Wikipedia at www.wikipedia.org; dated May 5, 2006; 13 pages.

* cited by examiner

SYNCHRONIZATION AND SEGMENT TYPE DETECTION METHOD FOR DATA TRANSMISSION VIA AN AUDIO COMMUNICATION SYSTEM

TECHNICAL FIELD

The present invention relates generally to data communication over a telecommunications network and, more particularly, to techniques for synchronizing and identifying different types of data segments sent asynchronously over an audio communication system such as a wireless CDMA cellular network.

BACKGROUND OF THE INVENTION

Asynchronous data transmission over audio communication systems typically involves sending frames of data segments, with the data being encoded into a modulated audio frequency carrier signal and prefixed with a synchronization signal. A correlator is then often used at the receiving end to determine the start of the data segment; that is, the start of the modulated carrier signal, so that the receiving modem can know where in the signal to begin decoding data. The received frame of data is cross-correlated to a known (reference) synchronization signal and peaks indicating high cross-correlation are then used to indicate the location of the beginning of the data payload.

In wireless telecommunications system, such as a CDMA cellular network, a vocoder is used to compress the inputted speech to achieve efficient wireless transmission of audio over a voice channel of the system. For digital (non-speech) data sent via the voice channel, particular encoding techniques are used to encode the data into a modulated carrier signal that can be successfully sent via the vocoder without loss of the digital data. Suitable techniques may be dependent upon the particular vocoder used. The success of transmission can depend, in part, on the ability of the receiving modem to determine the correct synchronization sequence location. For modulated digital data sent via the vocoder, the transmission can include noise introduced by the vocoder during the encoding process, raising the possibility that an incorrect position in the received data frame might produce the highest cross-correlation with the reference synchronization signal, and thereby resulting in an erroneous determination of the start of data. Furthermore, the data segment from one frame to the next might have different attributes, such as length and, although this length information could be added to the header or otherwise included in the data segment, doing so increases the overhead of the data segment.

Thus, there is a need for a data transmission approach for use with an audio communication system that provides reliable identification of the start of the data payload as well as an identification of one or more attributes of that payload.

SUMMARY OF THE INVENTION

The present invention provides a method of data communication using a wireless communication network that allows the transmission of digital data over a voice channel of the communications network. In accordance with one embodiment, the method includes the steps of:

generating a data frame containing a data segment using the steps of:

selecting a synchronization signal based on an attribute of the data segment; and prefixing the data segment with the selected synchronization signal;

sending the data frame over a wireless communication system having a first vocoder that encodes the data frame prior to transmission and a second vocoder that decodes the encoded data frame after receipt of the transmission;

identifying the selected synchronization signal from the decoded data frame; and determining the attribute based on the identified synchronization signal.

The synchronization signal can be selected from a plurality of different synchronization signals. Preferably, the selected synchronization signal has low cross-correlation and has an auto-correlation that approximates a unit impulse function. As one example of a suitable synchronization signal, a modified maximum length sequence can be used that has a zero mean. The attribute of the data segment for which the synchronization signal is selected can be, for example, the length of the data segment, a type of data encryption, the type of encoding used by the vocoder, a type of modulation used to encode data in the data segment, or a type of error correction used in the data segment.

In this way, the synchronization signal can provide reliable synchronization with the start of the data segment, even when transmitted via a voice channel of an audio communication system that uses a vocoder, and can provide the receiver with an indication of the length or other attribute of the received data segment.

BRIEF DESCRIPTION OF THE DRAWINGS

Preferred exemplary embodiments of the invention will hereinafter be described in conjunction with the appended drawings, wherein like designations denote like elements, and wherein.

DETAILED DESCRIPTION OF THE PREFERRED EMBODIMENTS

Figure 1:
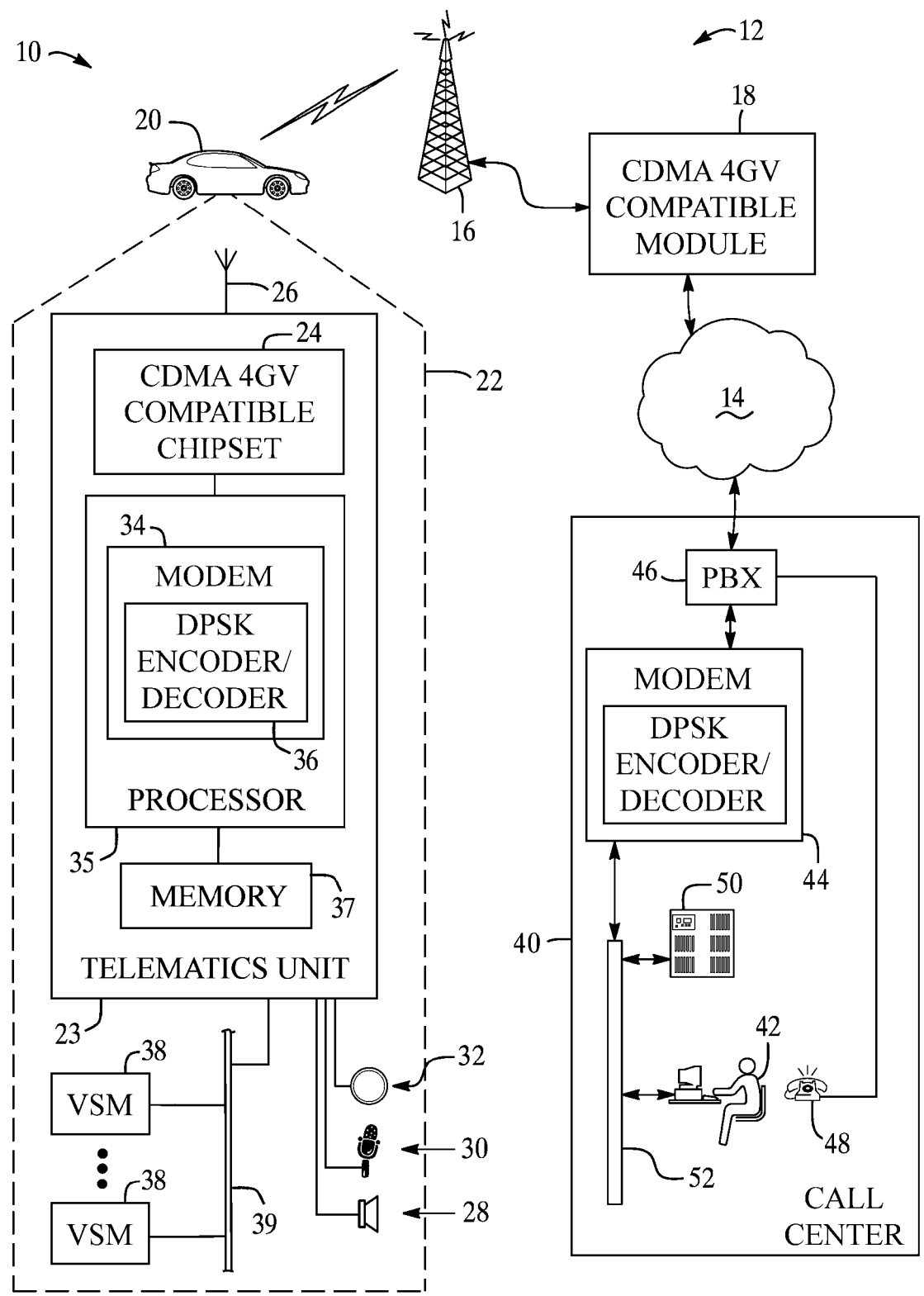
FIG. 1 is a block diagram depicting an electronic communication system constructed in accordance with the invention.

Referring to FIG. 1, there is shown an electronic communication system 10 constructed in accordance with the invention. The communication system 10 includes a conventional cellular communication network having a voice traffic channel that is used for two-way transmission of voice data between cellular telephones. The communication system 10 also includes the ability to utilize the cellular system voice channel to exchange digital data containing information other than speech or other audio. As will be discussed in greater detail below, this data communication is carried out at least in part using a data frame structure which utilizes different synchronization signals that operate to both identify the start of modulated data in the frame and to identify one or more attributes of the data. This data frame structure is useful for asynchronous transmission of data segments over audio communication systems and especially in those situations where there may be high noise and/or there is a need to transmit any of a variety of different data segments (i.e., segments that might vary from one to the next by length, encoding scheme, or other attribute).

The communication system 10 includes in general a cellular communication network 12 connected to a land telephony network 14 which together are used to provide voice and data communication between a passenger vehicle 20 and a call center 40. Vehicle 20 has an onboard electronics system, a portion of which is shown at 22. Electronics system 22 has a telematics unit 23 that includes the components normally found in a cellular communication device, such as a CDMA compatible chipset 24 and antenna 26 that enables the cellular network 12 to permit a vehicle occupant to carry on voice conversations using a speaker 28 and microphone 30. These components of telematics unit 23 can be implemented in a conventional manner, as will be known to those skilled in the art. Apart from the microphone 30 input, onboard system 22 also includes at least one pushbutton 32 that can be used to initiate a voice communication with a live advisor 42 located at the call center 40.

In accordance with 4G CDMA systems, voice data from both the vehicle occupant (not shown) and the live advisor 42 are encoded using a vocoder to compress the speech prior to wireless transmission over the voice traffic channel via the cell tower 16. Once received over the wireless network, the encoded speech is then decoded by the vocoder for the listener. The vocoder is incorporated into the chipset 24 as well as in a CDMA compatible module 18 located in the base equipment at the cell tower 16. Although various compression codecs can be used, in the illustrated embodiment, the 4G vocoder is implemented as a time-varying, non-linear filter. Various such codecs are well known using linear predictive techniques; for example, a RPE-LPC codec or a fixed or variable rate CELP codec. Any suitable codec (whether linear predictive or not) can be used in the system 10 of FIG. 1.

In addition to the typical voice data transmission over the voice traffic channel, the communication system 10 enables data communication via this same voice traffic channel and through the vocoder 18, 24. This is accomplished using a modem on either side of the vocoder; that is, using a first modem 34 incorporated into the onboard vehicle communication system 22 and a second modem 44 located at the call center 40. These modems can have the same construction and operation so that only modem 34 will be described, and it will be appreciated that the description of modem 34 applies equally to modem 44. As shown in FIG. 1, the telematics unit 23 can switch or multiplex the CDMA 4GV chipset 24 between the modem 34 and the telephony devices 28-32 so that the cellular communication network 12 can be used for either voice or data communication, or both, even during the same call.

Regardless of whether the cellular call is initiated at the vehicle 20 or call center 40, the transmitting modem can use a predefined tone (e.g., 2225 Hz) or series of tones to alert the receiving modem of the requested data transmission, and the various attributes of the data connection can then be negotiated by the two modems. To enable data communication over the voice channel, the modem applies a selected type of encoding to convert the digital data being transmitted into a modulated carrier signal that can be successfully sent via the vocoder 18, 24 and over the voice traffic channel of the cellular network 12. Suitable modulation schemes may depend upon the particular vocoder used by the system. For example, for an EVRC modem following one of the service options of the 3gpp2 specification (e.g., the C.S0014-C ver. 1.0 standard, available at www.3gpp2.org), a differential phase shift keying (DPSK) modulation approach can be used. Such techniques are further described in co-pending and commonly-owned U.S. patent application Ser. No. 11/554,985, filed Oct. 31, 2006, and U.S. patent application Ser. No. 11/163,579, filed Oct. 24, 2005, now published as U.S. Patent Publication No. US 2007-0092024 A1. The complete contents of these two applications is hereby incorporated by reference. As discussed in those applications, encoding of the digital data is implemented by modem 34 using one or more carrier signals that are modulated with the data using an encoder/decoder 36.

As illustrated in FIG. 1, modem 34 and its encoder/decoder 36 can be implemented using software running on the telematics microprocessor 35. This software can be stored in the telematics memory 37. Other alternative implementations will be apparent to those skilled in the art; for example, the modem 34 could be incorporated into the 4GV chipset 24, or can be implemented using a dedicated IC or other hardware component, or the modem software could be stored on processor 35 itself or on other memory not shown.

On the vehicle 20, the digital data being encoded and sent via modem 34 can be obtained by the telematics unit 23 from one or more vehicle system modules (VSMs) 38 over a vehicle network 39. These modules 38 can be any vehicle system for which information transmission is desired to or from the call center 40 or other remote device or computer system. For example, one VSM 38 can be a diagnostic system that provides diagnostic trouble codes or other diagnostic information to the call center 40. As another example, VSM 38 can be a GPS-enabled navigation system that uploads coordinates or other such information concerning the vehicle's location to the call center. Data can be transmitted from the call center (or other remote device or computer system) to the vehicle as well. For example, where VSM 38 is a navigation system, new maps or other directional or point of interest information can be downloaded to the vehicle. As another example, a VSM 38 can be an infotainment system in which new music or videos can be downloaded and stored for later playback. Furthermore, the term "digital data" as used herein includes not only information, but also executable code such that new programming can be downloaded to the vehicle via the voice traffic channel from a server or other computer. Those skilled in the art will know of other such VSMs 38 and other types of digital data for which communication to and/or from the vehicle 20 is desired.

The vehicle network 39 can be implemented as any suitable network, such as a controller area network (CAN), a media oriented system transfer (MOST), a local interconnection network (LIN), an Ethernet, a local area network (LAN), and can utilize appropriate connections and protocols such as those that conform with known ISO, SAE and IEEE standards and specifications. A separate infotainment network (not shown) can also be included for access by the telematics unit 23 to a vehicle radio system, in which case the speaker 28 could be eliminated and instead the vehicle radio system speaker(s) used for audio output during voice conversations through the communications system 12.

Land network 14 can be a conventional land-based telecommunications network that is connected to one or more landline telephones and connects wireless carrier network 12 to call center 40. For example, land network 14 can include a public switched telephone network (PSTN) and/or an Internet Protocol (IP) network, as is appreciated by those skilled in the art. Of course, one or more segments of land network 14 could be implemented through the use of a standard wired network, a fiber or other optical network, a cable network, power lines, other wireless networks such as wireless local area networks (WLANs) or networks providing broadband wireless access (BWA), or any combination thereof. Furthermore, call center 40 need not be connected via land network 14, but could include wireless telephony equipment so that it can communicate directly with wireless network 12.

Call center 40 includes not only the live advisor 42 and modem 44, but also several other components. It includes a PBX switch 46 to route incoming calls either to one or more telephones 48 for voice communication or to modem 44 for data transmission. The modem 44 itself can be connected to various devices such as a server 50 that provides information services and data storage, as well as a computer used by the live advisor 42. These devices can either be connected to the modem 44 via a network 52 or alternatively, can be connected to a specific computer on which the modem 44 is located. The various components of FIG. 1 include some that are conventional and others that can be implemented based upon the description contained herein, the applications incorporated by reference, and the knowledge possessed by one skilled in the art. For example, the modems 34, 44 and their encoder/decoder can be implemented by those skilled in the art using software and/or components such as DSPs and ASICs. Similarly, the other features needed to implement the modems 34, 44 are all well known to those skilled in the art.

Figure 2:
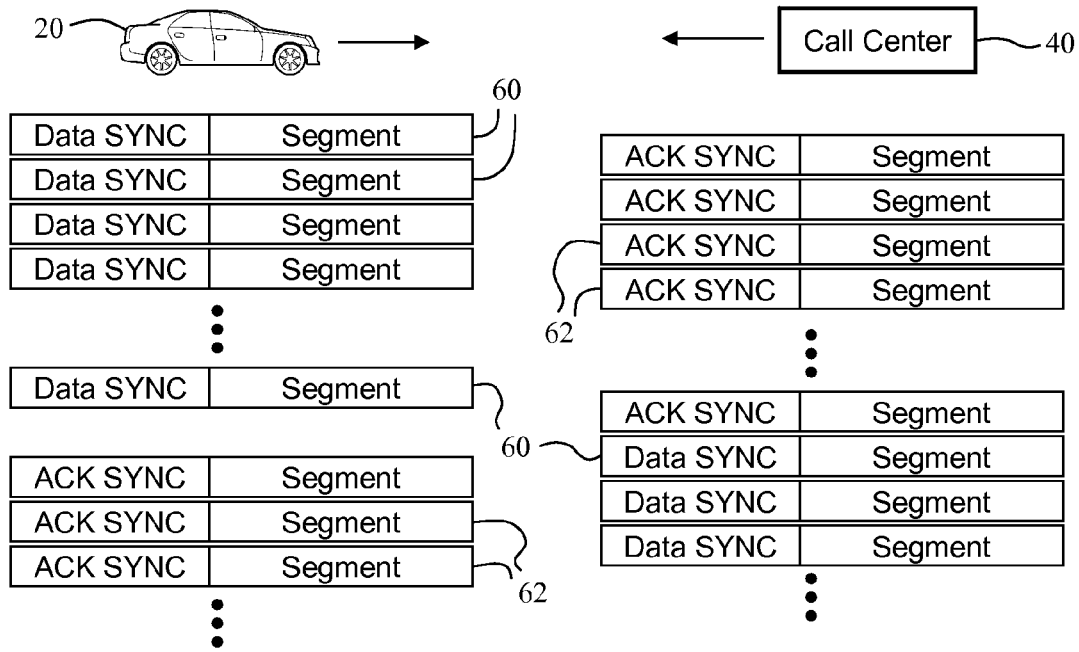
FIG. 2 is a diagram depicting the exchange of data payload and acknowledgement frames between the vehicle and call center of FIG. 1.

Referring now to FIG. 2, there is shown an exemplary exchange of data between the vehicle 20 and call center 40. In general, the exchange involves frames of data 60 being sent from the vehicle with each frame 60 being acknowledged by a return message 62 from the call center. The frames 60 contain a payload of data being delivered and are therefore larger than the return messages acknowledging successful receipt. Accordingly, these data frames 60 are referred to herein as data payload frames, whereas the return messages 62 are referred to herein as acknowledgement frames. After the vehicle has sent a number of data payload frames 60 and they have each been acknowledged, then in this FIG. 2 example the call center begins itself sending data payload frames 60 to the vehicle, which sends a return acknowledgement frame 62 for each received data payload frame 60. Where a transmitted frame 60 is not acknowledged, the frame can be resent until successfully acknowledged, and various suitable retransmission approaches will be known by those skilled in the art.

Figure 3:
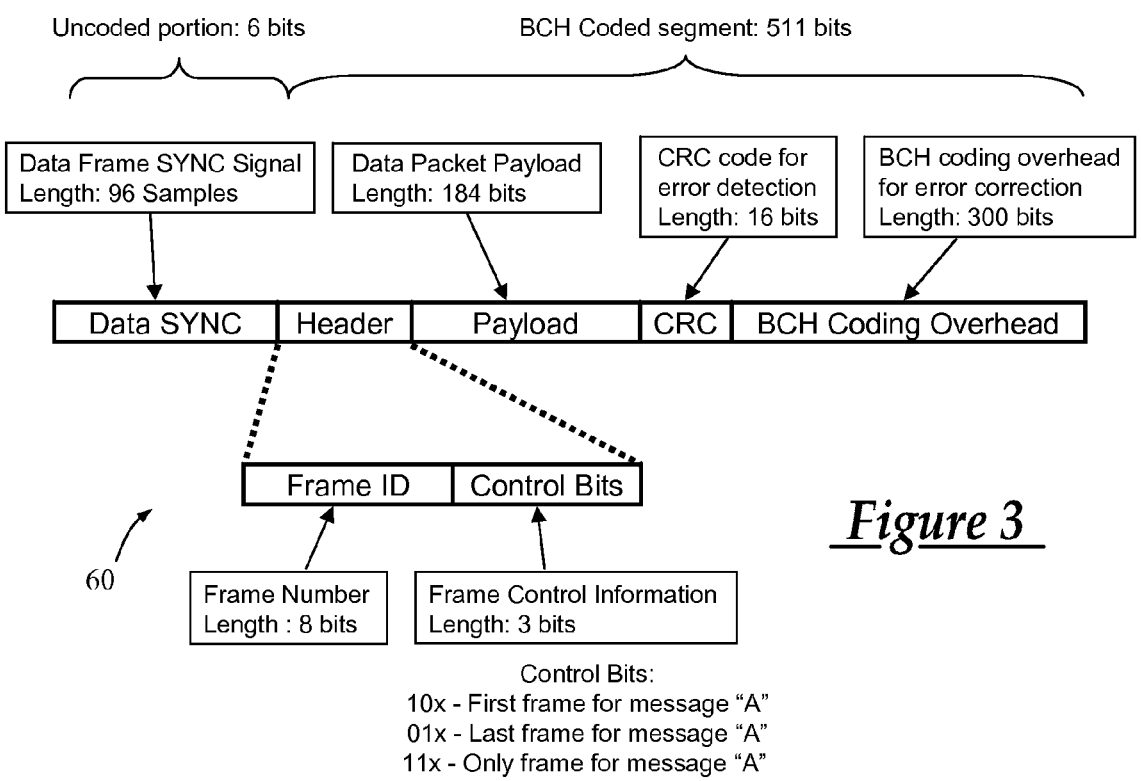
FIG. 3 is a diagram showing the structure of a data payload frame.

As will be described below, by utilizing a synchronization signal that is different for the data payload frames 60 than for the acknowledgement frames 62, the receiving modem can determine what type of frame is being received and therefore, not only where the data begins, but its length. FIG. 3 depicts the structure of a data payload frame and it can be seen that the frame includes a synchronization signal (Data SYNC) along with a data segment that includes, in addition to the payload, some overhead in the form of a header, CRC (cyclic redundancy check), and BCH (Bose, Ray-Chaudhuri, Hocquenghem) error correction. This structure is exemplary only and it will be understood that the data payload frame need not have this structure, but could include more or less segment fields than are shown. The data segment comprises a 511-bit BCH coded segment with the first 11 bits forming the header which includes an 8-bit frame ID and 3 control bits. The frame ID is a number that distinguishes the frame from others that are sent and is used by the acknowledgement frame to confirm receipt. The first two control bits tell the receiving system whether the frame is the first frame in a multi-message communication (10x), an intermediate frame (00x), the last frame of the message (01x), or the only frame of a single frame message (11x). The data payload being sent is 184 bits with a 16 bit CRC checksum. Since the header, payload, and CRC together comprise 211 bits, another 300 bits are allocated to the BCH error correction, which will permit up to 41 bit errors to be corrected. This BCH error correction coding scheme can be represented as BCH(N,K,T), where N is the codeword length, typically $N=2^m-1$, K is the input information bit length, and T is the number of bit errors that can be corrected. Thus, for the data payload frame 60, the BCH code is BCH(511,211, 41). Those skilled in the art will appreciate that other suitable error correction schemes could be used in addition to or in lieu of those disclosed herein.

Figure 4:
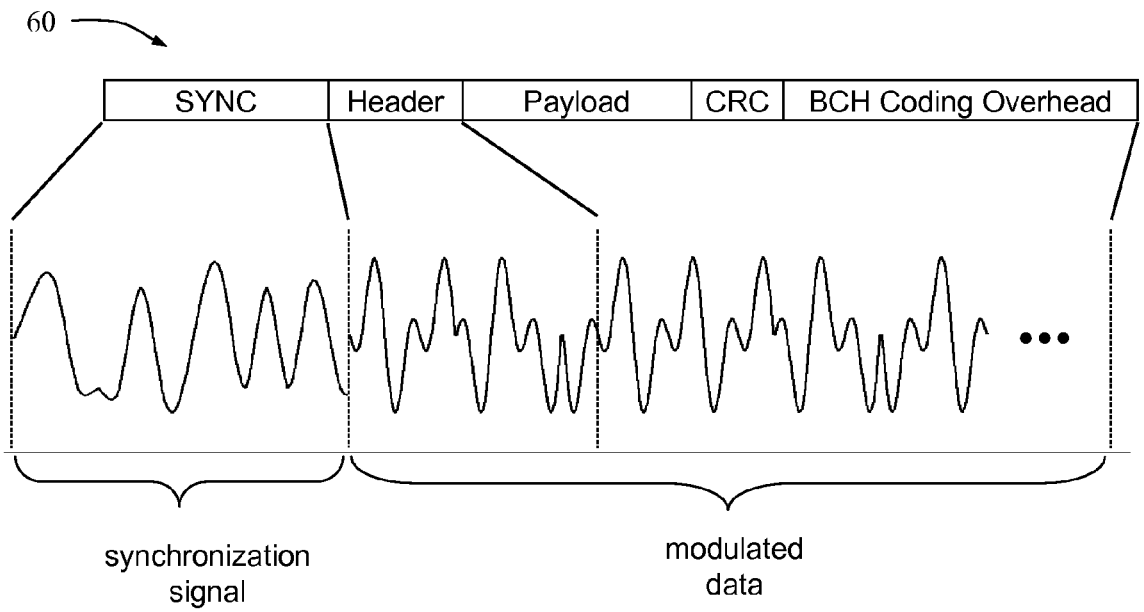
FIG. 4 is a plot of an exemplary data frame such as shown in FIG. 3.

Turning now to FIG. 4, there is shown an example waveform for the synchronization signal and modulated data of the data payload frame. The synchronization signal is a non-modulated audio-frequency signature that is used to (1) permit synchronization of the receiving modem with the modulated data segment and (2) identify the type of data segment and, thus, some attribute of that data segment such as its length. Synchronization of the receiving modem with the start of data first involves a coarse synchronization that is provided by way of a 20 ms pause (silence) between data frames so that the modem can approximately know when to begin looking for the sync. Then, precise synchronization involves use of a correlator that applies the incoming signal to a separate filter for each of the different synchronization signals until the received synchronization signal is correctly identified. Each filter represents one of the known synchronization signals, and the use of correlators and filters to carry them out is known to those skilled in the art.

To help prevent mis-sync's, the synchronization signal exhibits low cross-correlation and has an auto-correlation that approximates the unit impulse function. For example, Gold sequences can be used, and these are known to those skilled in the art. As another example, a modified maximum length sequence (MLS) such as a modified MLS-15 can be used. The modified MLS-15 can be constructed by first generating or providing an MLS-15 sequence, deleting one bit from the sequence so that the resulting sequence has a zero mean, and then adding a zero bit at each end of the sequence to produce a ramp-up and ramp-down. An exemplary modified maximum length sequence for the data payload frame is [0 1 1 −1 −1 −1 1 −1 −1 1 1 −1 1 −1 1 0]. The final synchronization signal shown in FIG. 4 can then be obtained by passing the 16 bits through a low pass interpolation filter which up-samples the sequence by six times to thereby produce a 96 samples synchronization signal.

Figure 5:
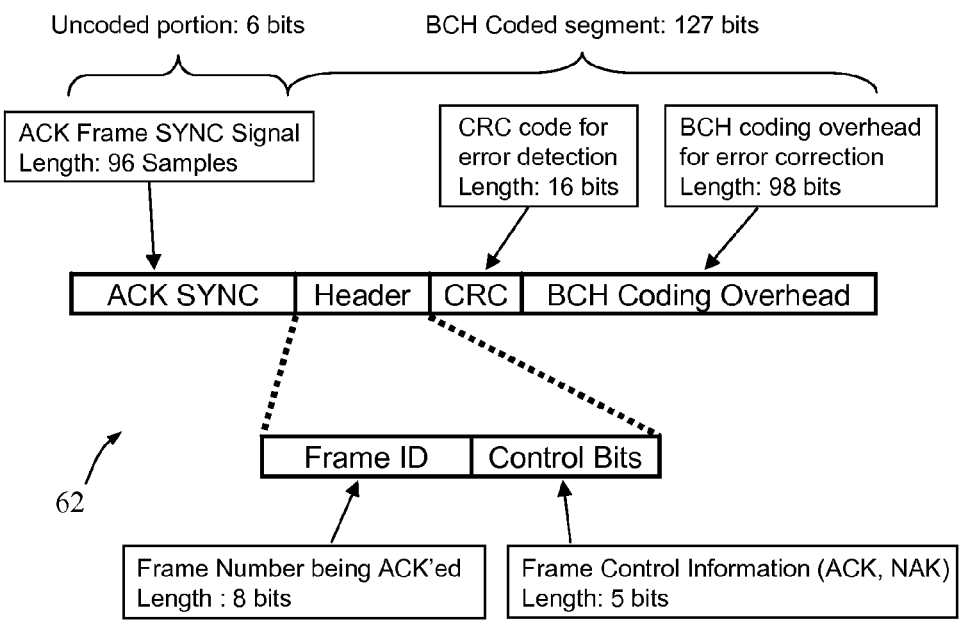
FIG. 5 is a diagram showing the structure of an acknowledgement frame.

FIG. 5 depicts the acknowledgement frame 62 with its synchronization signal (ACK SYNC) and data segment. For the acknowledgement frame, there is no payload since it is only confirming successful receipt of a data payload frame. Thus, the data segment includes a header, CRC, and BCH coding overhead. The header includes the 8-bit frame ID of the data payload frame being acknowledged, and 5 bits of control information to identify, for example, whether the frame was successfully received (ACK) or unsuccessfully received (NAK) the latter of which might indicate, for example, that the data payload frame's CRC checksum did not match, in which case the frame needs to be retransmitted. For the acknowledgement frame 62, the BCH error correction code is BCH(127, 29, 21). The ACK SYNC synchronization signal is distinguishable from the Data SYNC signal used in the data payload frames 60 so that the receiving modem can determine which type of frame is being received. The ACK SYNC does, however, include the same general properties as the Data SYNC; that is, good cross-correlation and auto-correlation that enables successful detection even though the frames are sent via a voice channel of the cellular network. A unique modified maximum length sequence constructed in the manner described above can be used; for example [0 –1 1 1 –1 –1 1 –1 –1 –1 1 1 1 1 –1 0].

Figure 6:
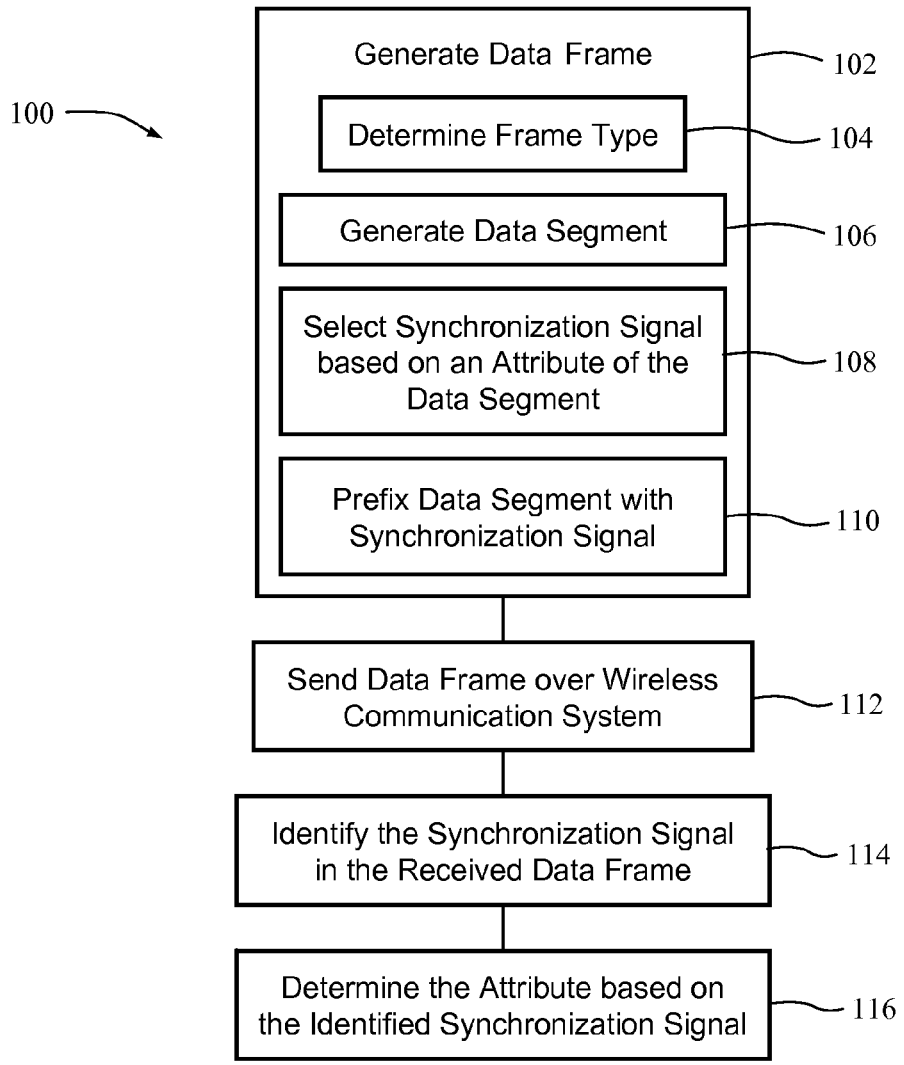
FIG. 6 is a flowchart depicting the steps of a method of asynchronous data communication using the system of FIG. 1 along with the data frame structure shown in FIGS. 3-5.

FIG. 6 depicts a process 100 for asynchronous data transmission over the cellular communication system 12 using the data frames described above. The method 100 begins with the step 102 generating the data frame (either a data payload frame, acknowledgement frame, or otherwise), and this involves determining the frame type 104, generating the data segment 106, selecting the synchronization signal 108 based on an attribute of the data segment such as segment length, modulation technique, etc., and then prefixing the data segment 110 with the selected synchronization signal. Once the data frame is generated, it is then transmitted 112 over a wireless communication system such as the cellular network 12 of FIG. 1. For communication via a voice channel of the cellular network, this involves the data frame being encoded via a vocoder for wireless transmission and decoded after transmission by a second vocoder. Once at the receiving end, the data frame is processed as discussed above to locate and identify the synchronization signal 114. Based on this identified synchronization signal, one or more attributes of the data segment are determined 116; for example, the type of data segment (e.g., data payload frame v. acknowledgement frame) and thus its overall length (e.g., 511 bits v. 127 bits) as well as what fields are present (e.g., header, payload, CRC, BCH) and their individual lengths.

Figure 7:
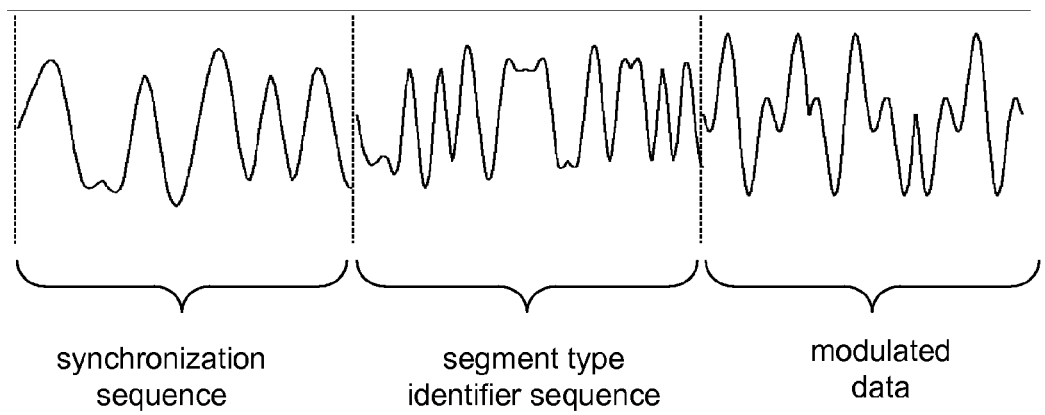
FIG. 7 is a plot showing an alternative synchronization signal that includes both a synchronization sequence common to all data frames and a segment type identifier sequence that is unique to each type of data frame.

Referring now to FIG. 7, there is shown an alternative approach to providing unique synchronization signals that serve the dual purpose of providing a robust sync and identifying some attribute of the data frame/segment. In this approach, the synchronization signal comprises a two-part signal that includes a synchronization sequence that is common to all the data frames, followed by a segment type identifier sequence that uniquely identifies the type or other attribute of the data segment. Here, the synchronization sequence can be any suitable sequence such as a modified maximum length sequence described above. This same synchronization sequence is used in all data frames regardless of type to allow the receiving modem to locate the start of data. The segment type identifier sequence then comprises a second part of the overall synchronization signal and each unique segment type identifier is provided such that it can be distinguished from the others. All of the segment type identifiers used have the same length so that the receiving modem will know based on the synchronization sequence where to start data demodulation.

Figure 8:
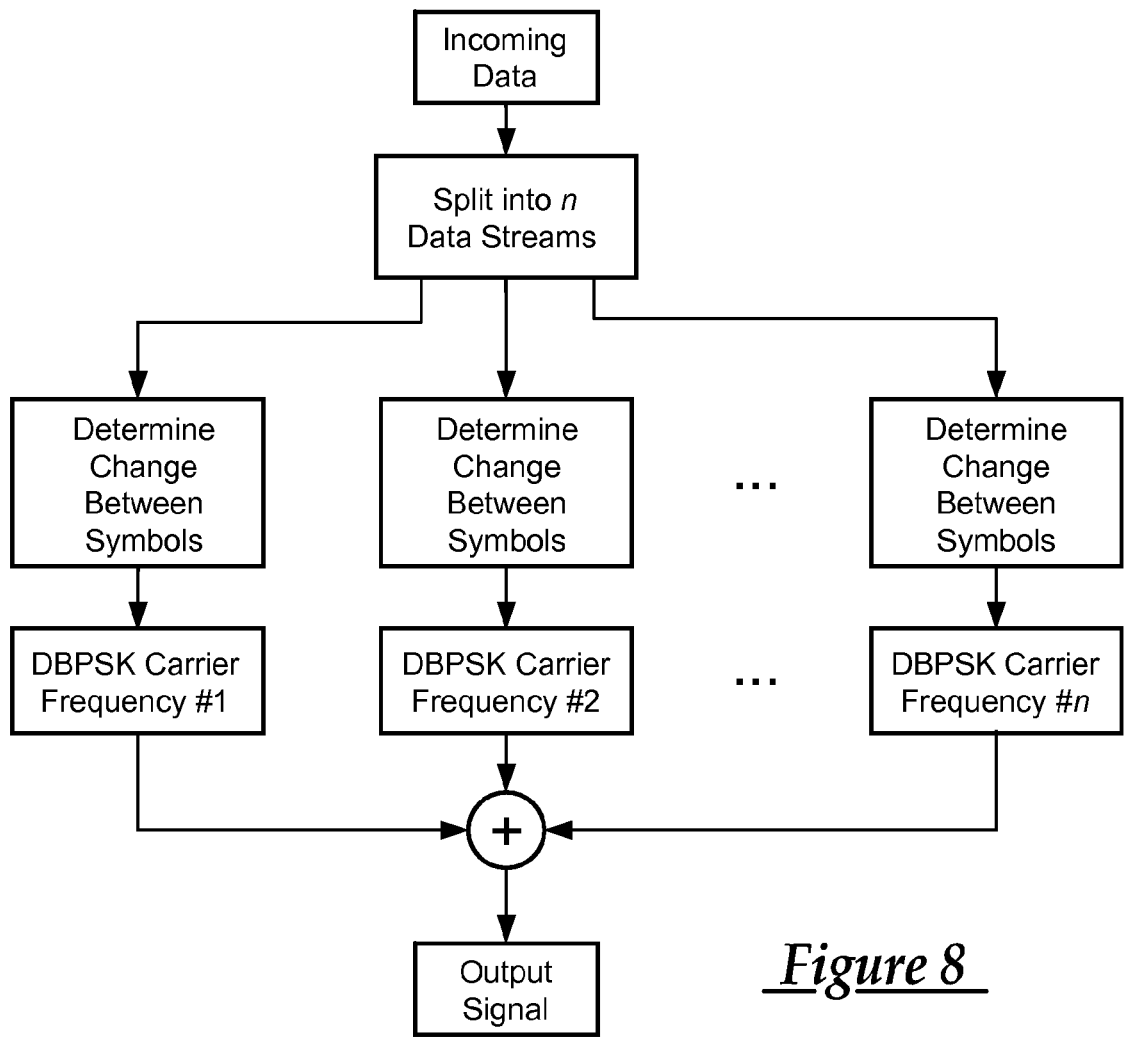
FIG. 8 is a flow chart of a multi-DPSK modulation scheme.
Figure 9:
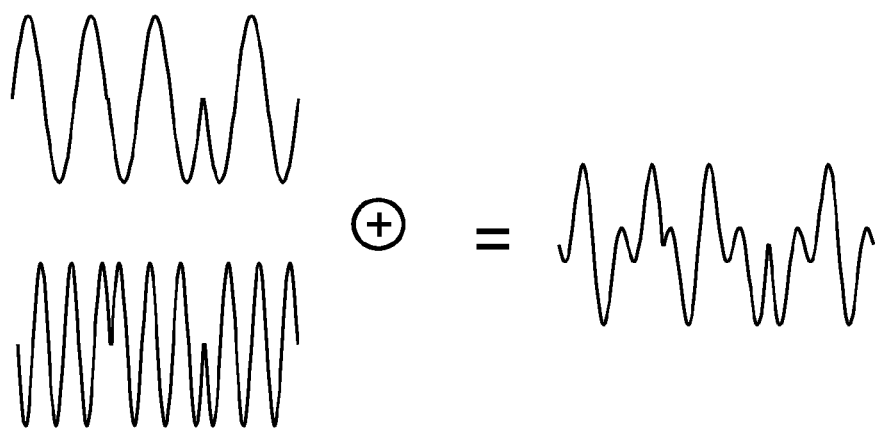
FIG. 9 depicts two DBPSK modulated carrier signals at different frequencies and the resulting composite modulated carrier signal obtained by using the process of FIG. 8.

For purposes of encoding the data of the data segments into a carrier wave suitable for transmission over the cellular network 12, any modulation technique suitable for use with the vocoders and other system components can be used. For example, FIG. 8 shows one technique that uses a combination of differential binary phase shift keying (DBPSK) modulations to transmit digital data through an EVRC-B vocoder and over a voice channel of the cellular communications system 12. In this embodiment, DBPSK is carried out by splitting the digital data into a desired number n of different streams with DBPSK being used on each stream to encode a different frequency carrier signal based on the change between the symbols (i.e., 0 to 1 or 1 to 0) in the digital data. The modulated carrier signals are then summed together to form a composite modulated carrier signal. When separating the incoming digital data into the different streams, different portions of the data are used for each stream so that, for example, where only two streams (two carrier frequencies) are used, alternating groups of the digital data (e.g., 10 bytes at a time) are used to modulate carrier signal #1 and the remaining alternating groups of digital data are used to modulate carrier signal #2. The size of each group can be selected as desired or appropriate for a particular application, whether it be done in larger groups or only as a single bit so that each successive bit is modulated at a different frequency than its predecessor. The size of the groups need not be the same so that, for example, larger groups of data could be encoded at a higher frequency while smaller groups of data could be encoded at a lower frequency. FIG. 9 depicts an example of two individual modulated carrier signals, each at a different frequency, and shows the resulting composite modulated carrier signal after they are summed together. Suitable carrier frequencies can include 650 Hz and 1150 Hz in one direction (e.g., vehicle to call center) and 900 Hz and 1500 Hz in the other direction (e.g., call center to vehicle).

Demodulation of the DBPSK data streams can be performed jointly. The data streams can be separated out by distinguishing between the different carrier frequencies. Once separated by frequency, the correct differential phase can then be determined for each of the known carrier frequencies, and the digital data can then be recovered through standard DBPSK demodulation techniques.

All of the processes described above in connection with FIGS. 2-9 can be carried out via software programming using the various components of the system 10 of FIG. 1.

Although in the illustrated embodiment, the unique synchronization signals are used to identify the type of data frame and, thus, length of the data segment, it will be appreciated that attributes other than segment type or length can be associated with the different synchronization signals used. For example, rather than identifying length, the synchronization signal can be used to indicate a type of data encryption, the type of encoding used by the vocoders, a type of modulation used to encode data in the data segment, or a type of error correction used in the data segment. The type of data encryption can be used for secure communications by identifying how the payload in the data segment is encrypted so that the receiving system will know how to decrypt it. The vocoder encoding type can be used by the receiving system to adjust its demodulation approach to account for expected codec-specific effects on the received data segment. The type of modulation used to encode the data segment tells the receiving modem how to demodulate the data. And the type of error correction allows the use of varying error correction approaches to be used so that, for example, the error correction used can be optimized for the particular data segment, or size of data segment, being sent. Other suitable uses of the different synchronization signals will become apparent to those skilled in the art.

It is to be understood that the foregoing description is of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, although only two types of data frames are included in the illustrated embodiment, three or more different types of frames could be used in which case there could be a corresponding number of different synchronization signals to identify them. All such other embodiments, changes, and modifications are intended to come within the scope of the appended claims.

As used in this specification and claims, the terms "for example" and "such as," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method of asynchronous data transmission over an audio communication system, comprising the steps of:
   generating a data frame containing a data segment using the steps of:
      selecting a synchronization signal based on an attribute of the data segment; and
      prefixing the data segment with the selected synchronization signal;
   encoding the data frame using a vocoder; and
   sending the encoded data frame over a wireless communication system.

2. The method set forth in claim 1, wherein the selecting step further comprises selecting one of a plurality of a non-modulated signature signals based on the attribute.

3. The method set forth in claim 2, wherein each of the signature signals comprises a single sampled sequence that is different from the other sequence(s).

4. The method set forth in claim 2, wherein each of the signature signals comprises a two-part sampled sequence that includes a synchronization sequence common to all of the signature signals and a segment type identifier sequence that is unique to each signature signal.

5. The method set forth in claim 2, wherein the selecting step further comprises selecting one of a plurality of a signature signals based on the attribute, wherein each of the signature signals has low cross-correlation.

6. The method set forth in claim 5, further comprising the step of storing the signature signals in a digital memory, wherein the selecting step comprises retrieving a selected signature signal from the digital memory.

7. The method set forth in claim 5, wherein the signature signals include first and second modified maximum length sequences.

8. The method set forth in claim 1, further comprising the step of generating the synchronization signal as an upsampled modified maximum length sequence.

9. The method set forth in claim 8, wherein the step of generating the modified maximum length sequence further comprises the steps of:
   providing an MLS;
   deleting one bit from the MLS such that the resulting sequence has a zero mean; and
   adding a zero at each end of the sequence.

10. The method set forth in claim 1, wherein the attribute is indicative of one of the following: the length of the data segment, a type of data encryption, the type of encoding used by the vocoder, a type of modulation used to encode data in the data segment, or a type of error correction used in the data segment.

11. A method of asynchronous data communication over an audio communication system, comprising the steps of:
   generating a data frame containing a data segment using the steps of:
      selecting a synchronization signal based on an attribute of the data segment; and
      prefixing the data segment with the selected synchronization signal;
   sending the data frame over a wireless communication system having a first vocoder that encodes the data frame prior to transmission and a second vocoder that decodes the encoded data frame after receipt of the transmission;
   identifying the selected synchronization signal from the decoded data frame; and
   determining the attribute based on the identified synchronization signal.

12. The method set forth in claim 11, wherein the selecting step further comprises selecting one of a plurality of a non-modulated signature signals based on the attribute.

13. The method set forth in claim 12, wherein each of the signature signals comprises a single sampled sequence that is different from the other sequence(s).

14. The method set forth in claim 12, wherein each of the signature signals comprises a two-part sampled sequence that includes a synchronization sequence common to all of the signature signals and a segment type identifier sequence that is unique to each signature signal.

15. The method set forth in claim 12, wherein the selecting step further comprises selecting one of a plurality of a signature signals based on the attribute, wherein each of the signature signals has low cross-correlation.

16. The method set forth in claim 11, wherein the identifying step further comprises correlating the synchronization signal to one of a plurality of different known synchronization signals by processing the decoded data frame using a plurality of filters.

17. The method set forth in claim 11, wherein the data frame comprises a data payload frame having a data payload in the data segment, and wherein the method further comprises the steps of sending back over the wireless communication system an acknowledgement frame that comprises a second synchronization signal and a second data segment, wherein the second synchronization signal is different than the synchronization signal contained in the data payload frame.

18. The method set forth in claim 17, wherein the determining step further comprises determining if the data frame is a data payload frame or an acknowledgement frame based on the synchronization signal.

19. The method set forth in claim 11, wherein the attribute is indicative of one of the following: the length of the data segment, a type of data encryption, the type of encoding used by the vocoders, a type of modulation used to encode data in the data segment, or a type of error correction used in the data segment.

20. A method of asynchronous data communication over an audio communication system, comprising the steps of:
   generating a data frame comprising a first synchronization signal followed by a first data segment that includes a frame ID, payload, and error correction;
   transmitting the data frame over a wireless audio communication system using vocoders to encode the data frame prior to wireless transmission and decode the data frame after the wireless transmission;

determining the location and length of the first data segment in the decoded data frame based on the first synchronization signal;

extracting the frame ID and payload from the first data segment;

generating an acknowledgement frame comprising a second synchronization signal followed by a second data segment containing the frame ID and having a second length that is different than the length of the first data segment;

transmitting the acknowledgement frame back over the wireless audio communication system using vocoders to encode the acknowledgement frame prior to wireless transmission and decode the acknowledgement frame after the wireless transmission; and determining the location and length of the second data segment in the received acknowledgement frame based on the second synchronization signal; and extracting the frame ID from the second data segment.

* * * * *